US012122240B2

(12) United States Patent
Deng

(10) Patent No.: US 12,122,240 B2
(45) Date of Patent: Oct. 22, 2024

(54) ALL-TERRAIN VEHICLE POWERTRAIN WITH CRANKSHAFT TO GENERATOR INTERFACE

(71) Applicant: SEGWAY TECHNOLOGY CO., LTD., Changzhou (CN)

(72) Inventor: Zhengchang Deng, Changzhou (CN)

(73) Assignee: SEGWAY TECHNOLOGY CO., LTD. (CN)

( * ) Notice: Subject to any disclaimer, the term of this patent is extended or adjusted under 35 U.S.C. 154(b) by 374 days.

(21) Appl. No.: 17/734,321

(22) Filed: May 2, 2022

(65) Prior Publication Data
US 2022/0250460 A1 Aug. 11, 2022

Related U.S. Application Data

(63) Continuation of application No. PCT/CN2020/126602, filed on Nov. 4, 2020.

(30) Foreign Application Priority Data

Nov. 4, 2019 (CN) .......................... 201911067302.X

(51) Int. Cl.
*B60K 6/24* (2007.10)
*B60K 6/26* (2007.10)
(Continued)

(52) U.S. Cl.
CPC ................ *B60K 6/405* (2013.01); *B60K 6/24* (2013.01); *B60K 6/26* (2013.01); *B60K 6/48* (2013.01); *B60K 2006/4825* (2013.01)

(58) Field of Classification Search
CPC .... B60K 1/04; B60K 6/48; B60K 2006/4825; B60K 6/24; B60K 6/405; B60K 6/26
See application file for complete search history.

(56) References Cited

U.S. PATENT DOCUMENTS 6,376,927 B1 * 4/2002 Tamai .................... B60K 6/383
290/31
6,840,045 B2 * 1/2005 Kusase ..................... F01N 5/04
903/905

(Continued)

FOREIGN PATENT DOCUMENTS

| CN | 202140168 U | 2/2012 |
| CN | 103282622 A | 9/2013 |

(Continued)

*Primary Examiner* — Jason D Shanske
*Assistant Examiner* — James J Triggs
(74) *Attorney, Agent, or Firm* — Emerson, Thomson & Bennett, LLC; Roger D. Emerson; Matt J. Wilson

(57) ABSTRACT

A hybrid powertrain includes: an engine and a generator. The engine includes a crankshaft and a crankcase, and a shaft end of the crankshaft extends out of the crankcase. The generator includes a generator installation cap, a generator housing, a generator cover, a stator, and a rotor. The generator installation cap is installed on a side of the crankcase, the generator housing is installed between the generator installation cap and the generator cover, the stator is fixed in the generator housing, and the rotor is disposed on the inner circumference of the stator, and is in transmission connection with the shaft end of the crankshaft. The generator housing is formed with an accommodating hole, the generator installation cap and the generator cover are each formed with an accommodating slot facing the generator housing, and the stator is accommodated in the accommodating hole and the two accommodating slots.

20 Claims, 7 Drawing Sheets

(51) Int. Cl.
*B60K 6/405* (2007.10)
*B60K 6/48* (2007.10)

(56) References Cited

U.S. PATENT DOCUMENTS

| | | | | |
|---|---|---|---|---|
| 2004/0012203 | A1* | 1/2004 | Schlangen | F02N 11/04 |
| | | | | 290/31 |
| 2004/0224817 | A1* | 11/2004 | Graf | B60W 30/18063 |
| | | | | 903/945 |
| 2009/0063014 | A1* | 3/2009 | Tokugawa | F02D 41/3082 |
| | | | | 701/103 |
| 2017/0203637 | A1* | 7/2017 | Berkson | B60H 1/004 |
| 2023/0083854 | A1* | 3/2023 | Jaccoud | B60W 10/08 |
| | | | | 701/22 |

FOREIGN PATENT DOCUMENTS

| | | |
|---|---|---|
| CN | 205955855 U | 2/2017 |
| CN | 107972471 A | 5/2018 |
| CN | 110206656 A | 9/2019 |
| CN | 110254205 A | 9/2019 |

* cited by examiner

ALL-TERRAIN VEHICLE POWERTRAIN WITH CRANKSHAFT TO GENERATOR INTERFACE

CROSS-REFERENCE TO RELATED APPLICATIONS

The present disclosure is a continuation of international application No. PCT/CN2020/126602 filed on Nov. 4, 2020, which claims priority to Chinese Patent Application No. 201911067302.X filed on Nov. 4, 2019, and entitled "ALL-TERRAIN VEHICLE AND HYBRID POWERTRAIN THEREOF", which are incorporated herein by reference.

TECHNICAL FIELD

The present disclosure relates to the technical field of all-terrain vehicles, in particular to an all-terrain vehicle and a hybrid powertrain thereof.

BACKGROUND

In the related art, an all-terrain vehicle generally adopts a single power source drive mode, and the single power source is usually a fuel engine or a power motor. If the power source is a fuel engine, the all-terrain vehicle generally suffers from insufficient power under a low engine speed condition; at the same time, since the engine has to operate under all operating conditions, in a process of changing operating conditions at low speed, the combustion of gas mixture is insufficient, the thermal efficiency is low, the fuel consumption is high, and the content of harmful gases in exhaust gas is high; or if the power source is a power motor, the all-terrain vehicle has the advantages of no exhaust gas discharge during travelling, low noise and simple structure, but at the same time there are also disadvantages such as short endurance range, high battery cost, long charging time, short battery service life and high maintenance cost.

SUMMARY

The present disclosure aims to solve at least one of the technical problems existing in the prior art. To this end, an objective of the present disclosure is to provide a hybrid powertrain, which may use fuel to generate electric energy, thereby increasing the travelling range of all-terrain vehicles and reducing the emission of harmful gases.

The present disclosure further proposes an all-terrain vehicle.

A hybrid powertrain according to the present disclosure, includes: an engine including a crankshaft and a crankcase, where the crankshaft is installed in the crankcase, and a shaft end of the crankshaft extends out of the crankcase; and a generator including a generator installation cap, a generator housing, a generator cover, a stator, and a rotor, where the generator installation cap is installed on a side of the crankcase, the generator housing is installed between the generator installation cap and the generator cover, the stator is fixed in the generator housing, and the rotor is disposed on the inner circumference of the stator and rotatable relative to the stator, and is in transmission connection with the shaft end of the crankshaft. The generator housing is formed with an accommodating hole, the generator installation cap and the generator cover are each formed with an accommodating slot facing the generator housing, and the stator is accommodated in the accommodating hole and the two accommodating slots.

Therefore, the hybrid powertrain consisting of an engine and a generator may convert power generated by the engine into electrical energy, and then supply it to an electric motor, thereby effectively increasing an endurance range of the all-terrain vehicle and solving the problem of insufficient power. In addition, since the generator is disposed on one side of the engine, the hybrid powertrain is small in size, takes up less space, and has better integrity.

In some examples of the present disclosure, the rotor is formed with a rotor hole, and the shaft end of the crankshaft passes through the rotor hole and is in transmission connection with the rotor.

In some examples of the present disclosure, the rotor is formed with an internal spline at the rotor hole, an external spline is formed at the shaft end of the crankshaft, and the internal spline fits with the external spline.

In some examples of the present disclosure, the rotor hole is formed with an inner tapered surface, the shaft end of the crankshaft is formed with an outer tapered surface, and the inner tapered surface fits with the outer tapered surface.

In some examples of the present disclosure, a middle part of the stator is accommodated in the accommodating hole, and two side parts of the stator are respectively accommodated in the two accommodating slots.

In some examples of the present disclosure, the accommodating hole is in an interference fit with the stator.

In some examples of the present disclosure, the generator installation cap is provided with a first limiting portion, two sides of the generator housing are provided with a second limiting portion and a third limiting portion respectively, the generator cover is provided with a fourth limiting portion, the first limiting portion is limited and fits with the second limiting portion, and the third limiting portion is limited and fits with the fourth limiting portion.

In some examples of the present disclosure, the crankcase includes: a first case, a second case, an oil sump and a side cover, the second case is connected to a bottom of the first case, the oil sump is connected to a bottom of the second case, and the oil sump includes: a bottom wall and a plurality of side walls, the plurality of side walls are connected onto different sides of the bottom wall, and at least one of the plurality of side walls is provided with an avoidance area for avoiding a transmission shaft.

In some examples of the present disclosure, the generator installation cap is provided with a fifth limiting portion, the crankcase is provided with a sixth limiting portion, and the fifth limiting portion is limited and fits with the sixth limiting portion.

In some examples of the present disclosure, one of the fifth limiting portion and the sixth limiting portion is a convex limiting ring and the other is a concave limiting groove, the motor installation cap is provided with a perforation for the shaft end of the crankshaft to pass through, the perforation is provided with a bearing, and the sixth limiting portion is provided around the bearing.

In some examples of the present disclosure, the stator is connected with an outlet end, and a part of the generator cover protrudes in a direction away from the generator housing to form an accommodating space for accommodating the outlet end; and the generator further includes: a case cover, and the case cover is arranged at the accommodating space.

In some examples of the present disclosure, a liquid cooling channel is formed in the generator housing, and the generator housing is further provided with a liquid inlet and a liquid outlet that communicate with the liquid cooling channel.

In some examples of the present disclosure, the generator installation cap is detachably installed on a side of the crankcase, the generator housing is detachably installed on a side of the generator installation cap, and the generator cover is detachably installed on a side of the generator housing.

In some examples of the present disclosure, the engine further includes: a cylinder block and two piston connecting rod groups, the cylinder block is disposed on an upper portion of the crankcase, the cylinder block has two cylinders, and pistons of the two piston connecting rod groups are respectively disposed in the two cylinders and connecting rods are respectively connected to the crankshaft.

A hybrid powertrain according to the present disclosure, includes: an engine, the engine including a crankshaft and a crankcase, where the crankshaft is installed in the crankcase, and a shaft end of the crankshaft extends out of the crankcase; and a generator, the generator including a generator housing, a generator cover, a stator, and a rotor, where the generator housing is installed on a side of the crankcase, the generator cover is installed on a side of the generator housing away from the crankcase, the stator is fixed in the generator housing, and the rotor is disposed on an inner circumference of the stator and rotatable relative to the stator, and is in transmission connection with the shaft end of the crankshaft. A liquid cooling channel is formed in the generator housing, and the generator housing is further provided with a liquid inlet and a liquid outlet that communicate with the liquid cooling channel.

In some examples of the present disclosure, the rotor is formed with a rotor hole, and the shaft end of the crankshaft passes through the rotor hole and is in transmission connection with the rotor.

In some examples of the present disclosure, the rotor is formed with an internal spline at the rotor hole, an external spline is formed at the shaft end of the crankshaft, and the internal spline fits with the external spline; or the rotor hole is formed with an inner tapered surface, the shaft end of the crankshaft is formed with an outer tapered surface, and the inner tapered surface fits with the outer tapered surface.

In some examples of the present disclosure, the stator is connected with an outlet end, and a part of the generator cover protrudes in a direction away from the generator housing to form an accommodating space for accommodating the outlet end; and the generator further includes: a case cover, and the case cover is arranged at the accommodating space.

The all-terrain vehicle according to the present disclosure, includes: the hybrid powertrain; a power battery, the power battery being connected to the generator; an electric motor, the electric motor being connected to the power battery; and a transmission system, an input end of the transmission system being connected to the electric motor.

Additional aspects and advantages of the present disclosure will be set forth, in part, from the following description, and in part will become apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings, where.

REFERENCE NUMERALS

Figure 1:
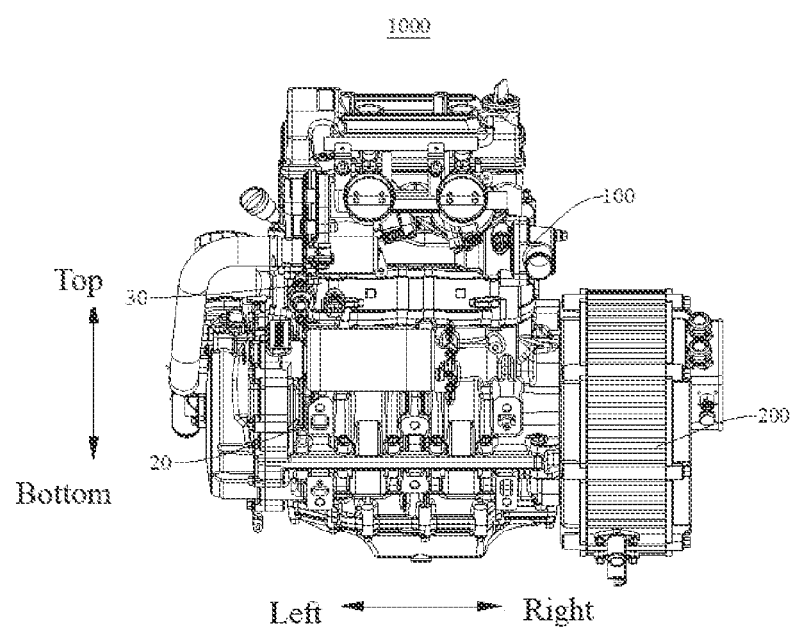
FIG. 1 is a schematic diagram of a hybrid powertrain according to an embodiment of the present disclosure.

All-terrain vehicle 5000;

Hybrid powertrain 1000; Power battery 2000; Electric motor 3000; Transmission system 4000:

Engine 100; crankshaft 10; external spline 10a; outer tapered surface 11; crankcase 20; first case 21; first shaft hole 21a; third shaft hole 21b; second case 22; second shaft hole 22a; fourth shaft hole 22b:

oil sump 23; bottom wall 23a; side wall 23b; avoidance area 23c; oil guide portion 23d; oil guide rib 23e; blocking cover 23f:

Side cover 24; first case cover 25; second case cover 26; sixth limiting portion 27; cylinder block 30; piston connecting rod group 40;

Generator 200; generator installation cap 210; perforation 211; accommodating slot 211; first limiting portion 212; fifth limiting portion 213;

Generator housing 220; accommodating hole 221; second limiting portion 222; third limiting portion 223; liquid inlet 224; liquid outlet 225; generator cover 230; fourth limiting portion 231; stator 240; middle part of the stator 241; side parts of the stator 242 243; rotor 250; rotor hole 251; case cover 260; transmission shaft 300.

DETAILED DESCRIPTION OF EMBODIMENTS

Embodiments of the present disclosure will be described in detail below. The embodiments described with reference to the accompanying drawings are exemplary, and the embodiments of the present disclosure will be described in detail below.

The following describes a hybrid powertrain 1000 according to an embodiment of the present disclosure with reference to FIGS. 1-11, and the hybrid powertrain 1000 is applied to an all-terrain vehicle. FIG. 12 is a block diagram of an all-terrain vehicle.

As shown in FIG. 1, the hybrid powertrain 1000 according to an embodiment of the present disclosure may include: an engine 100 and a generator 200. The generator 200 is disposed on an axial side of the engine 100, for example, the generator 200 is disposed on the right side of the engine 100. Here, the engine 100 and the generator 200 transmit power, the engine 100 drives the generator 200 to operate, the generator 200 generates electric energy, the generator 200 is connected to a power battery 2000 and an electric motor 3000 of the all-terrain vehicle 5000, and the power battery 2000 is connected to the electric motor 3000. In this way, the electric energy of the generator 200 may be supplied to the electric motor, so that the all-terrain vehicle may be driven to move.

Therefore, the hybrid powertrain consisting of the engine 100 and the generator 200 may convert power generated by the engine 100 into electrical energy, and then supply it to the electric motor, thereby effectively increasing an endurance range of the all-terrain vehicle and solving the problem of insufficient power. In addition, since the generator 200 is disposed on one side of the engine, the hybrid powertrain 1000 is small in size, takes up less space, and has better integrity. It should be noted that, the engine 100 in the hybrid powertrain 1000 may ensure continuous normal condition operation, thereby improving energy efficiency, reducing energy waste, and reducing the emission of harmful gases.

Figure 2:
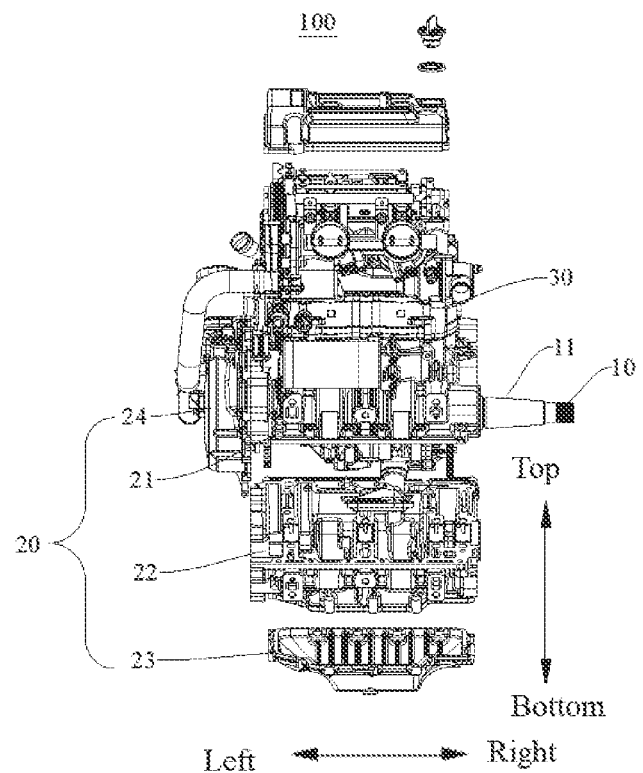
FIG. 2 is an exploded view of an engine.

As shown in FIG. 2, the engine 100 includes a crankshaft 10 and a crankcase 20, the crankshaft 10 is installed in the crankcase 20, and a shaft end (i.e., right side shaft end) of the crankshaft 10 extends out of the crankcase 20. The shaft end of the crankshaft 10 may facilitate power transmission between the engine 100 and the generator 200.

Figure 3:
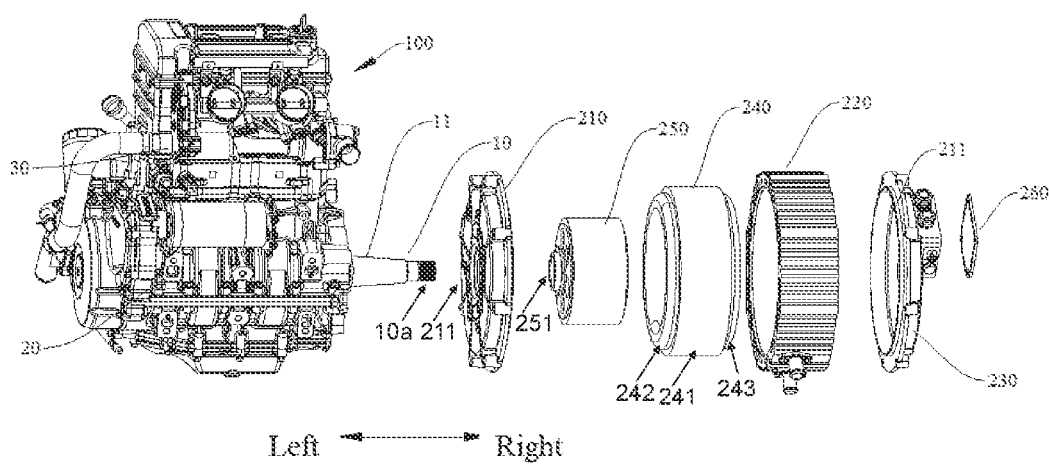
FIG. 3 is an exploded view of a hybrid powertrain at a generator according to an embodiment of the present disclosure.
Figure 4:
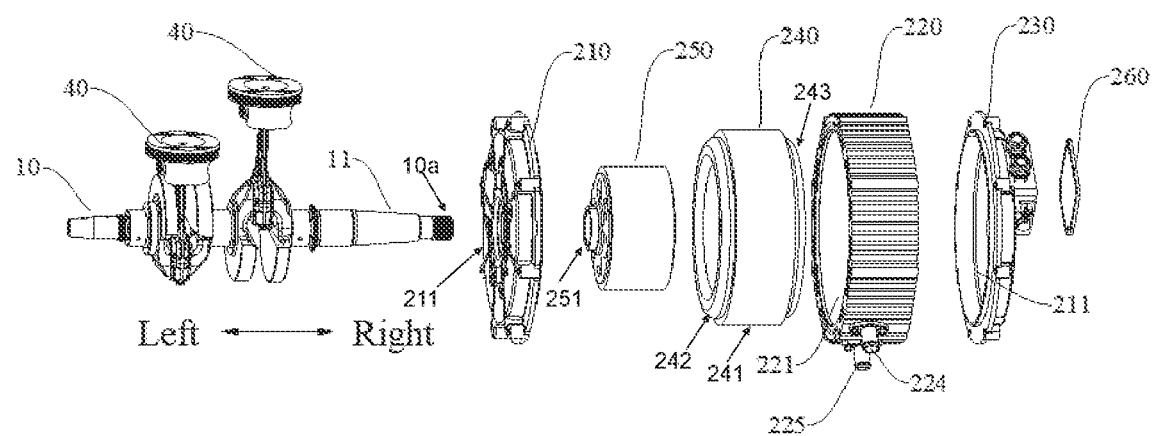
FIG. 4 is an exploded view of a generator.

As shown in FIG. 3 and FIG. 4, the generator 200 includes: a generator installation cap 210, a generator housing 220, a generator cover 230, a stator 240, and a rotor 250, the generator installation cap 210 is installed on a side of the crankcase 20, the generator housing 220 is installed between the generator installation cap 210 and the generator cover 230, the stator 240 is fixed in the generator housing 220, and the rotor 250 is disposed on an inner circumference of the stator 240 and rotatable relative to the stator 240, and is in transmission connection with the shaft end of the crankshaft 10. That is, the shaft end of the crankshaft 10 substantially passes through the generator installation cap 210 and fits with the rotor 250, and then drives the rotor 250 to rotate to generate electricity. In this way, the engine 100 and the electric motor 200 may be highly integrated, and a transmission efficiency is high.

Therefore, by providing the generator installation cap 210, the generator 200 may be securely installed on one side of the crankcase 20, which may further reduce a volume of the hybrid powertrain 1000, and by providing the generator installation cap 210, the generator housing 220 and the generator cover 230, the stator 240 and the rotor 250 may be reasonably installed, the installation reliability of the stator 240 and the rotor 250 may be ensured, and the transmission reliability of the shaft end of the crankshaft 10 and the rotor 250 may be ensured.

Of course, the generator housing 220 may also be installed on a side of the crankcase 20, and the generator cover 230 is then installed on a side of the generator housing 220 away from the crankcase 20.

According to an alternative embodiment of the present disclosure, the rotor 250 is formed with a rotor hole 251, and the shaft end of the crankshaft 10 passes through the rotor hole 251 and is in transmission connection with the rotor 250. That is, the rotor 250 is sleeved on the shaft end of the crankshaft 10, and then the rotor 250 and the shaft end of the crankshaft 10 are sleeved and fitted, so that synchronous rotation may be better ensured, the power transmission between the engine 100 and the generator 200 may be realized, and the power transmission stability of the engine 100 and the generator 200 may be ensured.

In an alternative embodiment, the rotor 250 is formed with an internal spline at the rotor hole 251, an external spline 10a is formed at the shaft end of the crankshaft 10, and the internal spline fits with the external spline 10a. The fitting of the internal spline and the external spline 10a is simple, reliable and easy to implement.

In another alternative embodiment, as shown in FIG. 3 and FIG. 4, the rotor hole 251 is formed with an inner tapered surface, the shaft end of the crankshaft 10 is formed with an outer tapered surface 11, and the inner tapered surface fits with the outer tapered surface 11. The inner tapered surface and the outer tapered surface 11 may abut against and fit each other, so that the rotor 250 can be securely installed on the shaft end, and the reliability and transmission stability of the rotor 250 and the shaft end may be ensured.

Specifically, as shown in FIG. 3 and FIG. 4, the generator housing 220 is formed with an accommodating hole 221, each of the generator installation cap 210 and the generator cover 230 is formed with an accommodating slot 211 facing the generator housing 220, and the stator 240 is accommodated in the accommodating hole 221 and the two accommodating slots 211. That is, the middle part 241 of the stator 240 is accommodated in the accommodating hole 221, and two side parts 242 243 of the stator 240 are respectively accommodated in the corresponding accommodating slots 211, so that the stator 240 may be effectively accommodated, the installation reliability of the stator 240 may be ensured, and an axial dimension of the generator housing 220 may be reduced.

Alternatively, the accommodating hole 221 is in an interference fit with the stator 240. The method of interference fit is simple and reliable, which may ensure the installation reliability of the stator 240 in the generator housing 220.

Figure 5:
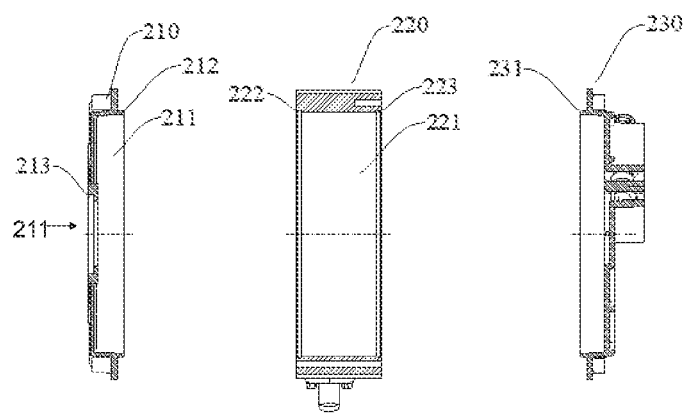
FIG. 5 is a sectional view of a generator installation cap, a generator housing and a generator cover.

According to a specific embodiment of the present disclosure, as shown in FIG. 5, the generator installation cap 210 is provided with a first limiting portion 212, two sides of the generator housing 220 are provided with a second limiting portion 222 and a third limiting portion 223 respectively, the generator cover 230 is provided with a fourth limiting portion 231, the first limiting portion 212 is limited and fits with the second limiting portion 222, and the third limiting portion 223 is limited and fits with the fourth limiting portion 231. The first limiting portion 212 and the second limiting portion 222 may play a role of pre-limiting the generator installation cap 210 and the generator housing 220, may reduce the installation difficulty of the generator 200, and may improve the installation reliability between the generator installation cap 210 and the generator housing 220. The third limiting portion 223 and the fourth limiting portion 231 may play a role of pre-limiting the generator housing 220 and the generator cover 230, may reduce the installation difficulty of the generator 200, and may improve the installation reliability between the generator housing 220 and the generator cover 230.

Here, as shown in FIG. 5, one of the first limiting portion 212 and the second limiting portion 222 is a convex limiting ring and the other is a concave limiting groove, one of the third limiting portion 223 and the fourth limiting portion 231 is a convex limiting ring and the other is a concave limiting groove. For example, the first limiting portion 212 and the fourth limiting portion 231 are both limiting rings, and the second limiting portion 222 and the third limiting portion 223 are both limiting grooves, so that the manufacturing difficulty of the generator housing 220 can be reduced at least to a certain extent. Through the fitting of the limiting grooves and the limiting rings, the structural reliability of the generator 200 may be improved, and the installation difficulty of the generator 200 may be reduced.

Figure 11:
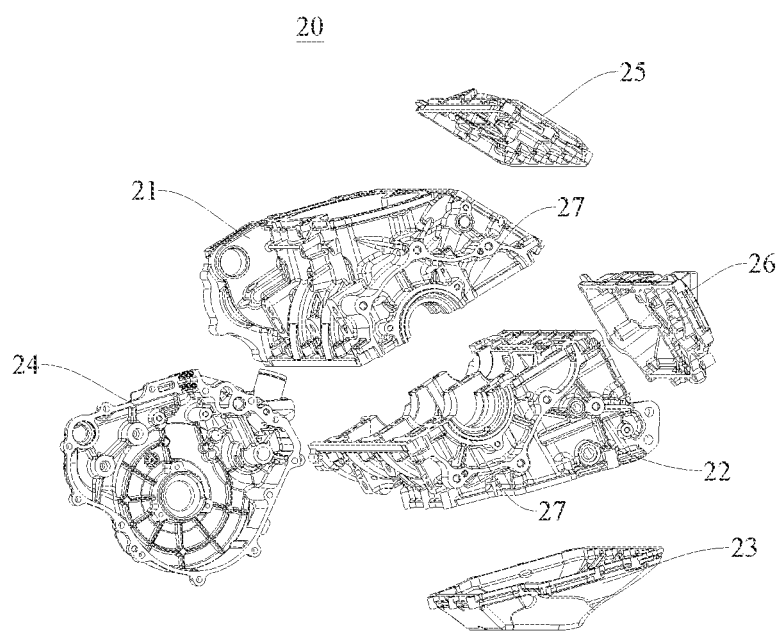
FIG. 11 is an exploded view of a crankcase.
Figure 12:
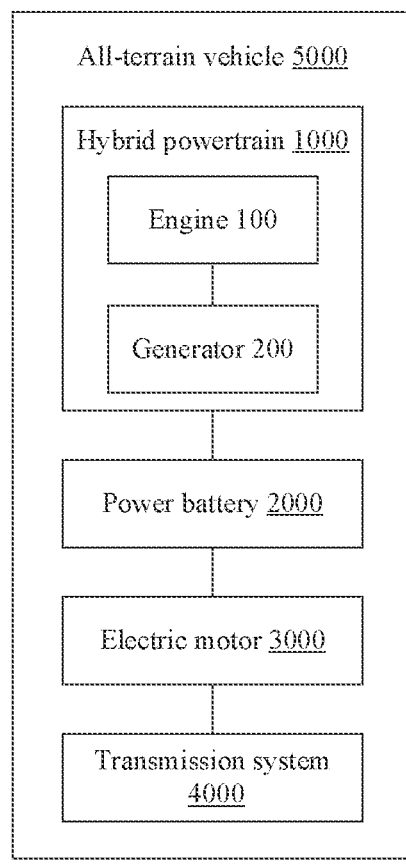
FIG. 12 is a block diagram of an all-terrain vehicle.

Also, as shown in FIG. 5 and FIG. 11, the generator installation cap 210 is provided with a fifth limiting portion 213, the crankcase 20 is provided with a sixth limiting portion 27, and the fifth limiting portion 213 is limited and fits with the sixth limiting portion 27. The fifth limiting portion 213 and the sixth limiting portion 27 may play a role of pre-limiting the generator installation cap 210 and the crankcase 20, may reduce the installation difficulty of the generator 200, and may improve the installation reliability of the generator installation cap 210 and the crankcase 20.

Here, as shown in FIG. 5 and FIG. 11, one of the fifth limiting portion 213 and the sixth limiting portion 27 is a convex limiting ring and the other is a concave limiting groove. For example, the fifth limiting portion 213 may be a limiting groove, and the sixth limiting portion 27 may be a limiting ring. Here, the generator installation cap 210 may be provided with a perforation 211 for the shaft end of the crankshaft 10 to pass through, the perforation 211 may be provided with a bearing, and the limit ring is provided around the bearing.

Alternatively, as shown in FIG. 3 and FIG. 4, the stator 240 is connected with an outlet end, and a part of the generator cover 230 protrudes in a direction away from the generator housing 220 to form an accommodating space for accommodating the outlet end, and the generator 200 further includes, a case cover 260, and the case cover 260 is arranged at the accommodating space. Therefore, the generator 200 may effectively solve the problem of the arrangement of the outlet end, and only needs to add the case cover 260, so that the manufacturing difficulty of the generator 200 may be simplified. A sealing gasket may be provided between the case cover 260 and the generator cover 230.

Specifically, as shown in FIG. 4, a liquid cooling channel is formed in the generator housing 220, and the generator housing 220 is further provided with a liquid inlet 224 and a liquid outlet 225 that communicate with the liquid cooling channel. That is, a cooling liquid may flow in the generator housing 220, and the cooling liquid provided in the cooling channel may take away heat generated when the generator 200 is operating, so as to effectively reduce a temperature of the generator 200, which may keep the temperature of the generator 200 within a reasonable operating temperature range.

Alternatively, the generator installation cap 210 is detachably installed on a side of the crankcase 20, the generator housing 220 is detachably installed on a side of the generator installation cap 210, and the generator cover 230 is detachably installed on a side of the generator housing 220. The detachable method may use fasteners for fixing connection. The generator 200 thus arranged has a simple structure and is easy to install, so that the installation difficulty of the generator 200 may be reduced, and subsequent maintenance may be facilitated.

Here, as shown in FIG. 4, the engine 100 may further include: a cylinder block 30 and two piston connecting rod groups 40, the cylinder block 30 is arranged on an upper portion of the crankcase 20, the cylinder block 30 has two cylinders, and pistons of the two piston connecting rod groups 40 are respectively disposed in the two cylinders and connecting rods are respectively connected to the crankshaft 10.

The crankcase 20 of the engine 100 according to an embodiment of the present disclosure will be described in detail below with reference to the accompanying drawings.

Figure 6:
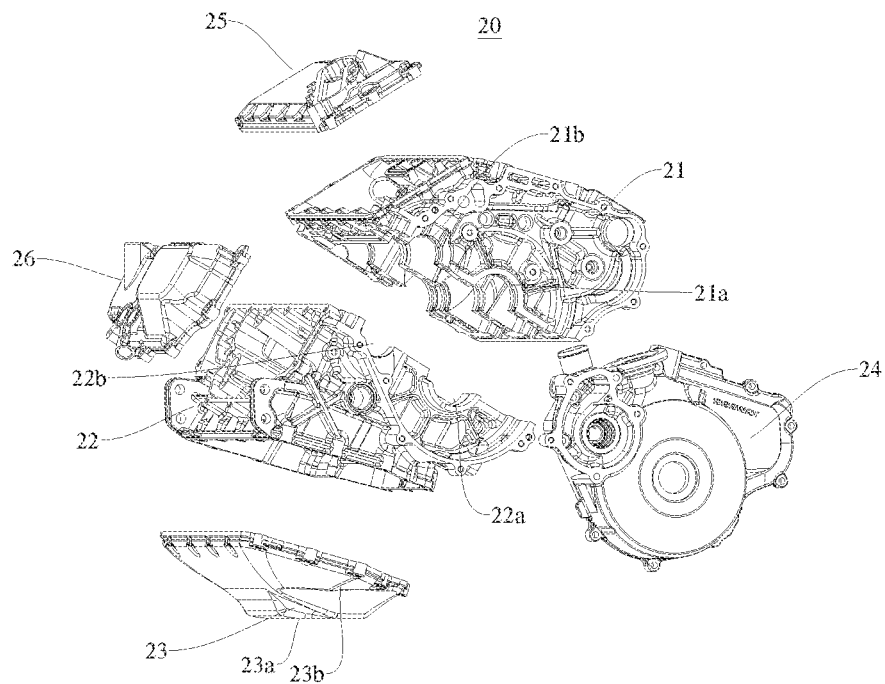
FIG. 6 is an exploded view of a crankcase.
Figure 7:
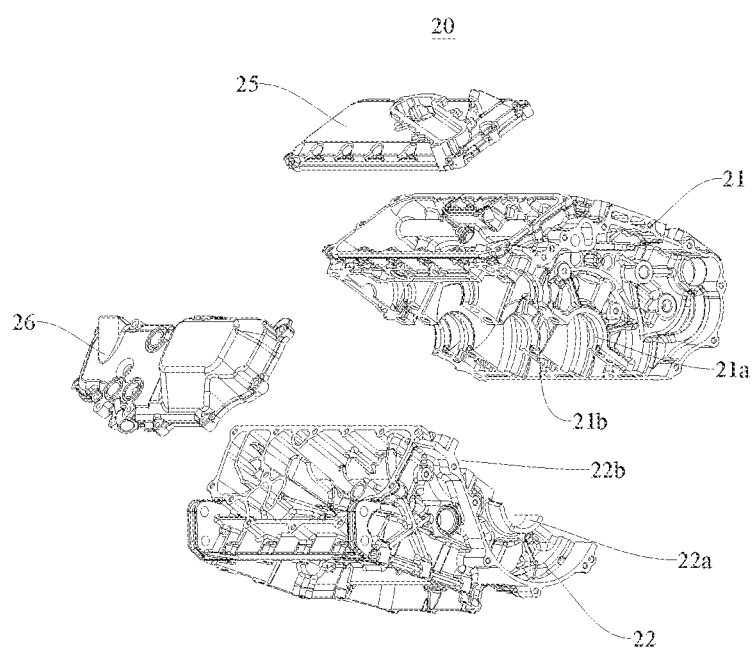
FIG. 7 is an exploded view of a crankcase.

As shown in FIGS. 6, 7 and 11, the crankcase 20 according to an embodiment of the present disclosure may include: a first case 21, a second case 22, an oil sump 23 and a side cover 24, the second case 22 is connected to a bottom of the first case 21, the second case 22 and the first case 21 define a crankshaft cavity and a crankshaft hole, the crankshaft cavity communicates with the crankshaft hole, the crankshaft hole is formed at one ends of the first case 21 and the second case 22, the oil sump 23 is connected to a bottom of the second case 22, and the side cover 24 is connected to the other ends of the first case 21 and the second case 22. The first case 21 and the second case 22 fit each other from top to bottom, so that the first case 21 and the second case 22 may define the crankshaft cavity, the crankshaft 10 may be accommodated in the crankshaft cavity, and the shaft end of the crankshaft 10 may extend out of the crankshaft cavity through the crankshaft hole, then extend into the generator 200 to fit with the rotor 250, where the crankshaft hole may be provided with a bearing or a bearing bush, which may ensure the rotational stability of the crankshaft 10. The side cover 24 may serve as a cover, so that the structural reliability of the crankcase 20 may be further improved.

Therefore, according to the crankcase 20 of an embodiment of the present disclosure, by reasonably arranging the first case 21 and the second case 22, it is convenient for the crankshaft 10 to extend out of the crankcase 20 to fit with the rotor 250, thereby being applicable to the hybrid powertrain 1000, and an overall structural arrangement is reasonable and the structural reliability is high.

As shown in FIG. 6 and FIG. 7, a plurality of first shaft holes 21a are formed on a lower side of the first case 21, a plurality of second shaft holes 22a are formed on an upper side of the second case 22, the plurality of first shaft holes 21a are in one-to-one correspondence with the plurality of second shaft holes 22a, so as to be suitable for installing the crankshaft 10. That is, the first shaft holes 21a of the first case 21 and the second shaft holes 22a of the second case 22 together fit with the crankshaft 10, which may facilitate the installation and arrangement of the crankshaft 10, and may reduce the arranging difficulty of the first case 21 and the second case 22.

Further, as shown in FIG. 6 and FIG. 7, a plurality of third shaft holes 21b are formed on the lower side of the first case 21, a plurality of fourth shaft holes 22b are formed on the upper side of the second case 22, the plurality of third shaft holes 21b are in one-to-one correspondence with the plurality of fourth shaft holes 22b, so as to be suitable for installing a balance shaft. The plurality of third shaft holes 21b and the plurality of first shaft holes 21a are arranged at intervals on the lower side of the first case 21, and the plurality of second shaft holes 22a and the plurality of fourth shaft holes 22b are arranged at intervals on the upper side of the second case 22. The first case 21 and the second case 22 thus arranged may also accommodate the balance shaft, the balance shaft is in transmission with the crankshaft 10, and the balance shaft may be used to balance a reciprocating inertial force generated when the piston connecting rod groups 40 move, so that a running smoothness of the engine 100 may be improved.

Specifically, as shown in FIG. 6 and FIG. 7, the first shaft holes 21a, the second shaft holes 22a, the third shaft holes 21b and the fourth shaft holes 22b may all be semicircular holes. The semicircular holes are easy to design and manufacture, and the shaft holes of this shape are easy to support the crankshaft 10 and the balance shaft, and may also facilitate the installation and arrangement of the bearing and the bearing bush.

Alternatively, oil grooves are provided inside the first shaft holes 21a, the second shaft holes 22a, the third shaft holes 21b and the fourth shaft holes 22b. There is lubricating oil flowing in the oil grooves, and the bearing or bearing bush may be communicated with the oil grooves, so that the lubricating oil may effectively lubricate a contact surface of the crankshaft 10 and the balance shaft, which may reduce a wear of the crankshaft 10 and the balance shaft, may prolong a service life of the crankshaft 10 and the balance shaft, and may improve the reliability of the crankshaft 10 and the balance shaft.

According to an alternative embodiment of the present disclosure, as shown in FIG. 6, the crankcase 20 further includes: a first case cover 25, the first case cover 25 is connected to a side of the first case 21, and the first case cover 25 and the first case 21 form a first accommodating cavity. The first accommodating cavity may play an accommodating role, may change a structure of the crankcase 20, and may make an overall layout of the crankcase 20 more reasonable.

Here, as shown in FIG. 6, with respect to a combined plane of the first case 21 and the second case 22, the first case cover 25 is inclined to an installation plane of and the first case 21. The first case cover 25 thus arranged may effectively adapt to a surface of the first case 21, and may ensure the installation reliability of the first case cover 25 on the surface of the first case 21. The first case cover 25 and the first case 21 may be fixedly connected by means of fasteners.

Further, as shown in FIG. 6, the crankcase 20 may further include: a second case cover 26, the second case cover 26 is connected to a side of the second case 22, and the second case cover 26 and the second case 22 form a second accommodating cavity. The second accommodating cavity communicates with the first accommodating cavity. The second accommodating cavity may play an accommodating role, may change the structure of the crankcase 20, and may make the overall layout of the crankcase 20 more reasonable.

Here, as shown in FIG. 6 and FIG. 11, with respect to the combined plane of the first case 21 and the second case 22, the second case cover 26 is perpendicular to an installation plane of the second case 22. The second case cover 26 thus arranged may effectively adapt to a surface of the second case 22, and may ensure the installation reliability of the second case cover 26 on the surface of the second case 22. The second case cover 26 and the second case 22 may be fixedly connected by means of fasteners.

Alternatively, the first case 21 is provided with at least two through holes, and the two through holes communicate with the crankshaft cavity. The two through holes may correspond to the two cylinders of the cylinder block 30, and may also correspond to the two piston connecting rod groups 40, that is, the crankcase 20 thus arranged may be applied to the two-cylinder engine 100, so that a power performance of the engine 100 may be improved, and a power generation efficiency of the generator 200 may be high.

Specifically, at least one of the first case 21 and the second case 22 is provided with a limiting portion for limiting the generator 200 at one end of the crankshaft hole. The limiting portion is the above sixth limiting portion 27, and the first case 21 and the second case 22 thus arranged may ensure the installation reliability of the generator 200.

The oil sump 23 of the crankcase 20 according to an embodiment of the present disclosure will be described in detail below with reference to the accompanying drawings.

Figure 8:
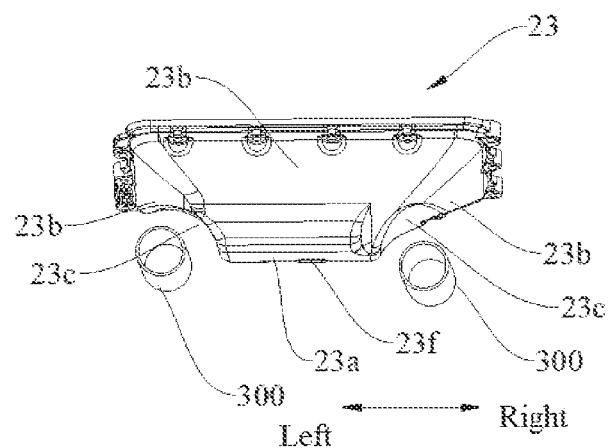
FIG. 8 is a schematic diagram of an oil sump and a transmission shaft.
Figure 9:
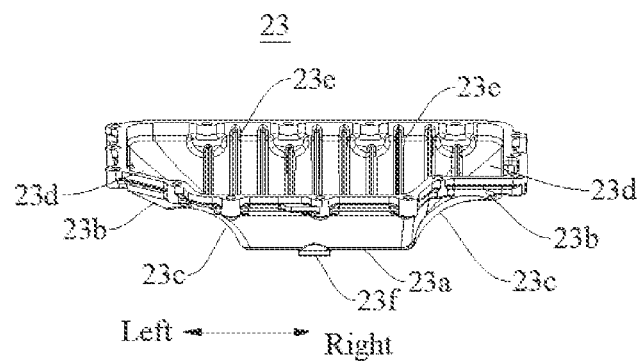
FIG. 9 is a schematic diagram of an oil sump.
Figure 10:
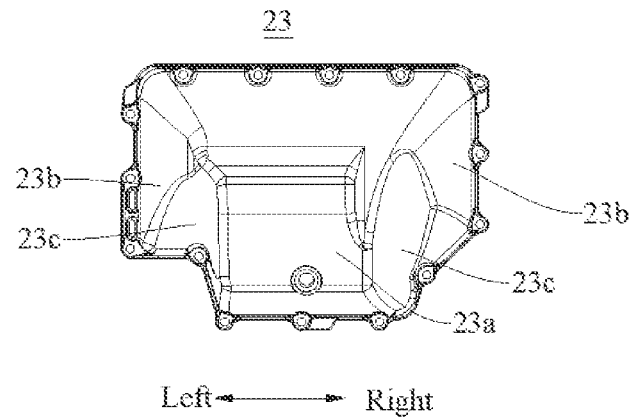
FIG. 10 is a schematic diagram of an oil sump.

As shown in FIGS. 8-10, the oil sump 23 according to an embodiment of the present disclosure may include: a bottom wall 23a and a plurality of side walls 23b, the plurality of side walls 23b are connected onto different sides of the bottom wall 23a, and the plurality of side walls 23b define an open oil groove above the bottom wall 23a. It may be understood that the oil groove is used to accommodate the lubricating oil, and the lubricating oil that lubricates the movement of the engine 100 flows downward under the action of gravity, and finally gathers into the oil groove. The lubricating oil in the oil groove may also be supplied upward in a certain method. For example, the oil supply method may be a sputtering method or a suction method. Here, circular arc transition is adopted between adjacent side walls 23b. The circular arc transition may make the oil sump 23 transition naturally, having high structural reliability and good integrity.

As shown in FIG. 8, at least one side wall 23b is provided with an avoidance area 23c for avoiding a transmission shaft 300. That is, the transmission shaft 300 is provided around the bottom wall 23a of the oil sump 23, the avoidance area 23c may effectively avoid the transmission shaft 300, and may give a certain accommodation space to the transmission shaft 300, so that an overall structure of the all-terrain vehicle may be reasonably arranged. In addition, at least to a certain extent, the minimum ground clearance of the all-terrain vehicle may be improved, and the passability of the all-terrain vehicle may be improved.

Alternatively, as shown in FIG. 8 and FIG. 9, a surface of the avoidance area 23c may be an arc-shaped surface concave toward the inside of the oil groove. The arc-shaped surface may effectively avoid the transmission shaft 300, and may reduce the manufacturing difficulty of the oil sump 23 and may improve the structural reliability of the oil sump 23.

Here, as shown in FIG. 8, two opposite side walls 23b are both provided with the avoidance areas 23c. That is, the left and right-side walls 23b of the oil sump 23 are both provided with the avoidance areas 23c, and two transmission shafts 300 are respectively disposed on both sides of the oil sump 23. The oil sump 23 thus arranged has a reasonable overall layout, may effectively avoid the two transmission shafts 300, and may make the overall layout of the all-terrain vehicle reasonable.

Alternatively, as shown in FIG. 9, each side wall 23b is provided with an oil guide portion 23d extending obliquely from an upper end toward the bottom wall 23a. The oil guide portion 23d may be an oil guide slope, which may facilitate the lubricating oil to flow downward to a bottom of the oil sump 23 and may improve the ability of the oil sump 23 to gather the lubricating oil.

Here, as shown in FIG. 9, an oil guide rib 23e is formed on an inner surface of each side wall 23b. The oil guide rib 23e may be a protruding rib, and the arrangement of the oil guide rib 23e may play a role of guiding oil on the one hand, and may improve the structural reliability of the oil sump 23 on the other hand.

Specifically, as shown in FIG. 8 and FIG. 9, the bottom wall 23a is formed with an oil drain hole, and a blocking cover 23f is provided at the oil drain hole. When the lubricating oil has not been replaced for a long time, a user or maintenance staff may open the blocking cover 23f, release the lubricating oil, and then replace the lubricating oil. Therefore, the replacement of the lubricating oil may be facilitated, and the performance of the engine 100 may be improved.

Alternatively, as shown in FIG. 8 and FIG. 10, a cross-sectional area of the oil sump 23 decreases from an opening to the bottom. That is, the oil sump 23 is configured to be tapered from top to bottom, and the oil sump 23 thus arranged is convenient for gathering the lubricating oil, which may facilitate the lubricating oil to lubricate the movement again.

Here, the oil sump 23 is an aluminum alloy housing. The aluminum alloy housing has high structural strength and light weight, and the oil sump 23 thus arranged conforms to a lightweight design goal of the all-terrain vehicle.

FIG. 12 is a block diagram of an all-terrain vehicle. The all-terrain vehicle 5000 according to an embodiment of the present disclosure includes the hybrid powertrain 1000, the power battery 2000, the electric motor 3000, and the transmission system 4000 of the above embodiments. The power battery 2000 is connected to the generator 200, the electric motor 3000 is connected to the power battery 2000, and an input end of the transmission system 4000 is connected to the electric motor 3000.

In the description of this specification, the description with reference to the terms "one embodiment". "some embodiments", "exemplary embodiments", "examples". "specific examples", or "some examples" etc. means that the specific features, structures, materials or characteristics described in combination with the embodiment or example are included in at least one embodiment or example of the present disclosure. In this specification, the schematic representations of the above terms do not necessarily refer to the same embodiment or example.

Although the embodiments of the present disclosure have been shown and described, those of ordinary skill in the art may understand that various changes, modifications, substitutions and variants may be made to these embodiments without departing from the principle and purpose of the present disclosure. The scope of the present disclosure is defined by the claims and their equivalents.

What is claimed is:

1. A hybrid powertrain, comprising:
   an engine, the engine comprising a crankshaft and a crankcase, wherein the crankshaft is installed in the crankcase, and a shaft end of the crankshaft extends out of the crankcase; and
   a generator, the generator comprising a generator installation cap, a generator housing, a generator cover, a stator, and a rotor, wherein the generator installation cap is installed on a side of the crankcase, the generator housing is installed between the generator installation cap and the generator cover, the stator is fixed in the generator housing, and the rotor is disposed on an inner circumference of the stator and rotatable relative to the stator, and the rotor is in a transmission connection with the shaft end of the crankshaft,
   wherein the generator housing is formed with an accommodating hole, the generator installation cap and the generator cover are each formed with an accommodating slot facing the generator housing, and the stator is accommodated in the accommodating hole and the two accommodating slots.

2. The hybrid powertrain according to claim 1, wherein the rotor is formed with a rotor hole, and the shaft end of the crankshaft passes through the rotor hole and is in a transmission connection with the rotor.

3. The hybrid powertrain according to claim 2, wherein the rotor is formed with an internal spline at the rotor hole, an external spline is formed at the shaft end of the crankshaft, and the internal spline fits with the external spline.

4. The hybrid powertrain according to claim 2, wherein the rotor hole is formed with an inner tapered surface, the shaft end of the crankshaft is formed with an outer tapered surface, and the inner tapered surface fits with the outer tapered surface.

5. The hybrid powertrain according to claim 1, wherein a middle part of the stator is accommodated in the accommodating hole, and two side parts of the stator are respectively accommodated in the two accommodating slots.

6. The hybrid powertrain according to claim 1, wherein the accommodating hole is in an interference fit with the stator.

7. The hybrid powertrain according to claim 1, wherein the generator installation cap is provided with a first limiting portion, two sides of the generator housing are provided with a second limiting portion and a third limiting portion respectively, the generator cover is provided with a fourth limiting portion, the first limiting portion is limited and fits with the second limiting portion, and the third limiting portion is limited and fits with the fourth limiting portion.

8. The hybrid powertrain according to claim 7, wherein the crankcase comprises: a first case, a second case, an oil sump and a side cover, the second case is connected to a bottom of the first case, the oil sump is connected to a bottom of the second case,
   and wherein the oil sump comprises: a bottom wall and a plurality of side walls, the plurality of side walls are connected onto different sides of the bottom wall, and at least one of the plurality of side walls is provided with an avoidance area for avoiding a transmission shaft.

9. The hybrid powertrain according to claim 1, wherein the generator installation cap is provided with a fifth limiting portion, the crankcase is provided with a sixth limiting portion, and the fifth limiting portion is limited and fits with the sixth limiting portion.

10. The hybrid powertrain according to claim 9, wherein one of the fifth limiting portion and the sixth limiting portion is a convex limiting ring and the other is a concave limiting groove, the generator installation cap is provided with a perforation for the shaft end of the crankshaft to pass through, the perforation is provided with a bearing, and the sixth limiting portion is provided around the bearing.

11. The hybrid powertrain according to claim 1, wherein the stator is connected with an outlet end, and a part of the generator cover protrudes in a direction away from the generator housing to form an accommodating space for accommodating the outlet end; and
   the generator further comprises: a case cover, and the case cover is arranged at the accommodating space.

12. The hybrid powertrain according to claim 1, wherein a liquid cooling channel is formed in the generator housing, and the generator housing is further provided with a liquid inlet and a liquid outlet that communicate with the liquid cooling channel.

13. The hybrid powertrain according to claim 1, wherein the generator installation cap is detachably installed on a side of the crankcase, the generator housing is detachably installed on a side of the generator installation cap, and the generator cover is detachably installed on a side of the generator housing.

14. The hybrid powertrain according to claim 1, wherein the engine further comprises: a cylinder block and two piston connecting rod groups, the cylinder block is disposed on an upper portion of the crankcase, the cylinder block has two cylinders, and pistons of the two piston connecting rod groups are respectively disposed in the two cylinders and connecting rods are respectively connected to the crankshaft.

15. A hybrid powertrain, comprising:
   an engine, the engine comprising a crankshaft and a crankcase, wherein the crankshaft is installed in the crankcase, and a shaft end of the crankshaft extends out of the crankcase; and
   a generator, the generator comprising a generator housing, a generator cover, a stator, and a rotor, wherein the generator housing is installed on a side of the crankcase, the generator cover is installed on a side of the generator housing away from the crankcase, the stator is fixed in the generator housing, and the rotor is disposed on an inner circumference of the stator and rotatable relative to the stator, and is in a transmission connection with the shaft end of the crankshaft, wherein a liquid cooling channel is formed in the generator housing, and the generator housing is further provided with a liquid inlet and a liquid outlet that communicate with the liquid cooling channel.

16. The hybrid powertrain according to claim 15, wherein the rotor is formed with a rotor hole, and the shaft end of the crankshaft passes through the rotor hole and is in a transmission connection with the rotor.

17. The hybrid powertrain according to claim 16, wherein the rotor is formed with an internal spline at the rotor hole, an external spline is formed at the shaft end of the crankshaft, and the internal spline fits with the external spline; or the rotor hole is formed with an inner tapered surface, the shaft end of the crankshaft is formed with an outer tapered surface, and the inner tapered surface fits with the outer tapered surface.

18. The hybrid powertrain according to claim 15, wherein the stator is connected with an outlet end, and a part of the generator cover protrudes in a direction away from the generator housing to form an accommodating space for accommodating the outlet end; and the generator further comprises: a case cover, and the case cover is arranged at the accommodating space.

19. An all-terrain vehicle, comprising:
a hybrid powertrain;
a power battery, the power battery being connected to the generator;
an electric motor, the electric motor being connected to the power battery; and
a transmission system, an input end of the transmission system being connected to the electric motor,
wherein the hybrid powertrain comprises an engine and a generator;
wherein the engine comprises a crankshaft and a crankcase, wherein the crankshaft is installed in the crankcase, and a shaft end of the crankshaft extends out of the crankcase;
wherein the generator comprising a generator installation cap, a generator housing, a generator cover, a stator, and a rotor, wherein the generator installation cap is installed on a side of the crankcase, the generator housing is installed between the generator installation cap and the generator cover, the stator is fixed in the generator housing, and the rotor is disposed on an inner circumference of the stator and rotatable relative to the stator, and the rotor is in a transmission connection with the shaft end of the crankshaft, and
wherein the generator housing is formed with an accommodating hole, the generator installation cap and the generator cover are each formed with an accommodating slot facing the generator housing, and the stator is accommodated in the accommodating hole and the two accommodating slots.

20. An all-terrain vehicle, comprising:
the hybrid powertrain according to claim 15;
a power battery, the power battery being connected to the generator;
an electric motor, the electric motor being connected to the power battery; and
a transmission system, an input end of the transmission system being connected to the electric motor.

* * * * *